United States Patent [19]

Batty et al.

[11] 4,327,632
[45] May 4, 1982

[54] BEVERAGE MAKER

[75] Inventors: Cyril Batty, Lymm; John L. Cooper, Stoke-on-Trent, both of England

[73] Assignee: Russell Hobbs Limited, Staffordshire, England

[21] Appl. No.: 775,874

[22] Filed: Mar. 9, 1977

[30] Foreign Application Priority Data

Mar. 16, 1976 [GB] United Kingdom ............... 10417/76

[51] Int. Cl.³ ............................................. A47J 31/00
[52] U.S. Cl. ....................................................... 99/320
[58] Field of Search ................. 99/295, 317, 326, 403, 99/319, 320, 304, 305; 200/84 C; 219/438

[56] References Cited

U.S. PATENT DOCUMENTS

| | | | |
|---|---|---|---|
| 173,265 | 2/1876 | Burkhardt et al. | 99/320 |
| 996,305 | 6/1911 | Bachelder | 99/320 X |
| 1,029,939 | 6/1912 | McLean | 99/320 |
| 1,362,644 | 12/1920 | Sprague, Jr. | 99/320 |
| 2,368,496 | 1/1945 | Sharp | 99/320 X |
| 3,181,951 | 4/1965 | Gronvold | 99/320 X |
| 3,342,960 | 9/1967 | Dillon et al. | 200/84 C |

FOREIGN PATENT DOCUMENTS

| | | | |
|---|---|---|---|
| 1276313 | 5/1972 | United Kingdom | 99/320 X |
| 1329311 | 9/1973 | United Kingdom | 99/320 |

Primary Examiner—Harvey C. Hornsby
Assistant Examiner—Arthur O. Henderson
Attorney, Agent, or Firm—Friedman, Goodman & Teitelbaum

[57] ABSTRACT

A beverage maker comprises a chamber in which water can be heated by means of an electrical heating element. A receptacle for containing a solid secondary constituent which is to be infused in the water floats freely on the surface of the water. The lower part of the receptacle is imperforate, but the upper part has one or more openings through which water can be splashed when the water boils. The receptacle is eventually sunk by water splashed in through the apertures. The sinking causes the heating element to be de-energized.

4 Claims, 2 Drawing Figures

BEVERAGE MAKER

BACKGROUND OF THE INVENTION

This invention relates to a beverage maker in which a liquid, called herein the primary constituent, is boiled and is mixed with a secondary constituent, for example tea leaves, to form a beverage.

One common form of beverage maker has a backet or like receptacle for the secondary constituent which is supported in a fixed position in an upper part of a chamber of the beverage maker above a body of the primary constituent. The latter is heated and is caused to flow through the receptacle and over the secondary constituent to form the beverage. This kind of beverage maker is commonly used for preparing infusions of coffee but is not useful for preparing infusions of tea, as the primary constituent which is mixed with the secondary constituent is not usually at its boiling point.

A further known kind of beverage maker has a basket or like receptacle for the secondary constituent which is temporarily held in an upper part of a chamber above a body of the primary constituent. When the latter boils, the receptacle is released so that it drops into the primary constituent and sinks to the bottom of the chamber. This kind of beverage maker is useful for preparing infusions of tea but a reliable mechanism for temporarily holding the receptacle above the body of primary constituent and then releasing the receptacle upon boiling is expensive.

SUMMARY OF THE INVENTION

It is an object of the invention to avoid the provision of a mechanism for temporarily holding the receptacle above a body of primary constituent and then releasing the receptacle when the primary constituent boils.

According to the invention there is provided a beverage maker comprising a chamber for containing a body of liquid primary constituent which is to be heated and a receptacle for the secondary constituent, characterised in that the receptacle has an imperforate bottom portion and is adapted to float on quiescent liquid indefinitely when containing only the secondary constituent, an upper portion of the receptacle defining an opening through which liquid can be splashed into the receptacle when the primary constituent is agitated by boiling and the receptacle being adapted to be sunk by the primary constituent which splashes in through the opening.

With this arrangement, the secondary constituent within the receptacle is maintained out of contact with the primary constituent until the latter boils and extensive contact between the two constituents is then promoted by sinking of the receptacle without there being any temperature-sensitive mechanism for controlling release of the receptacle from an upper position in the chamber. The receptacle floats freely on the primary constituent until the latter boils.

The receptacle is preferably massive, as compared with the quantity of tea leaves which would be placed in the receptacle for infusion in the primary constituent which can be contained in the chamber.

BRIEF DESCRIPTION OF THE DRAWINGS

The invention will now be described, by way of example, with reference to the accompanying drawings wherein.

Figure 2:
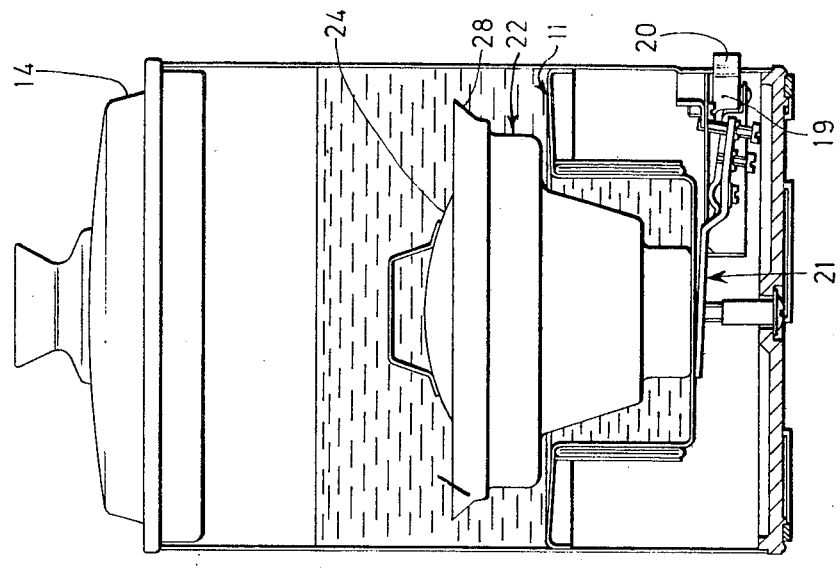
FIG. 2 shows a cross-section in a plane at right-angles to that of FIG. 1, the receptacle having sunk to the bottom of a chamber in the beverage maker.

The beverage maker shown in the accompanying drawing comprises a vessel 10 which is sub-divided by a partition wall 11 into upper and lower chambers 12 and 13 respectively. The vessel has a lid 14 which can be removed to enable access to be gained to the upper chamber 12 and there is also a pouring spout 15 which communicates with the upper chamber.

The partition wall 11 defines a central well 16 which is surrounded by a cylindrical part 17 of the wall. The lower chamber 13 contains an electrical heating element 18 which embraces the cylindrical part 17 of the wall and is in good thermal contact therewith. Also contained in the lower chamber 13 there is a switch 19 electrically connected with the heating element to control energisation thereof. Associated with the switch there is a first operating member 20 which is accessible from the exterior of the vessel 10 and enables the switch 19 to be opened or closed by a user. A second operating member for the switch 19 is in the form of a movable arm 21 which normally is disposed at a lowered position (shown in FIG. 1) in which it does not exercise control over the switch 19. When the arm 21 is raised to the position shown in FIG. 2, it opens the switch 19 which is then held open so that energisation of the heating element 18 is prevented.

The beverage maker further comprises a receptacle 22 which is disposed within the upper chamber 12. The receptacle comprises an imperforate lower portion 23 and an upper portion 24 which is detachably mounted on the lower portion. The receptacle is intended to contain a quantity of a secondary constituent, for example tea leaves, which is to be infused in primary constituent contained in the upper chamber 12. The relationship between the mass of water which is displaced by the lower portion 23 when the lower portion is submerged in water to the sum of the mass of the receptacle and the mass of the maximum quantity of tea leaves which could be contained in the receptacle is such that when the receptacle contains only tea leaves it will always float on quiescent water with the lower portion 23 extending upwardly to a level at least slightly above the level of the surface of the water. In the particular example shown, the lower portion 23 includes a laterally outwardly projecting rim 28 which extends upwardly from that part of the receptacle which is submerged when the receptacle floats in quiescent water. Typically, the height of the rim is 11 mm.

The upper portion 24 of the receptacle is so formed as to define at least one opening 30 through which water can be splashed into the receptacle when the body of water in which the receptacle is floating is agitated by boiling. Preferably, the upper part of the receptacle defines a large number of small openings such that tea leaves cannot readily escape from the receptacle. In the particular example shown, the upper portion 24 could be formed of perforate sheet material to which there is attached a handle. Alternatively, the upper portion could be in the form of a framework defining one or more openings across which there extends a metal gauze to retain the secondary constituent within the receptacle. The interior of the receptacle 22 is subdivided by a partition 25 into a lower, minor part and an upper, major part. The lower part contains a magnet 26 which, when the receptacle rests on the bottom of the wall 16, attracts the arm 21 to its upper position and holds it in that position.

When the beverage maker is to be used to prepare a beverage, the lid 14 is removed and the receptacle 22 is withdrawn from the upper chamber 12. A quantity of water or other primary constituent is charged into the upper chamber 12, the surface of the water being somewhat below the position occupied by the lid 14 when the latter is in position on the vessel. The upper portion 24 of the receptacle is formed as a detachable cover which can be removed to enable an appropriate quantity of tea leaves or other secondary constituent to be placed in the receptacle to lie above the partition 25. The upper portion 24 is then replaced, engaging beneath a lip 27 which holds it in position on the lower portion 23. The receptacle is then placed in the upper chamber 12 and the lid 14 refitted.

The receptacle, with its charge of tea leaves, floats on the water within the upper chamber 12 with the rim 28 lying above the surface of the liquid. The rim 28 reduces the risk of water splashed into the receptacle 22 when the beverage maker is moved by a user prior to the water in the upper chamber 12 being heated.

Figure 1:
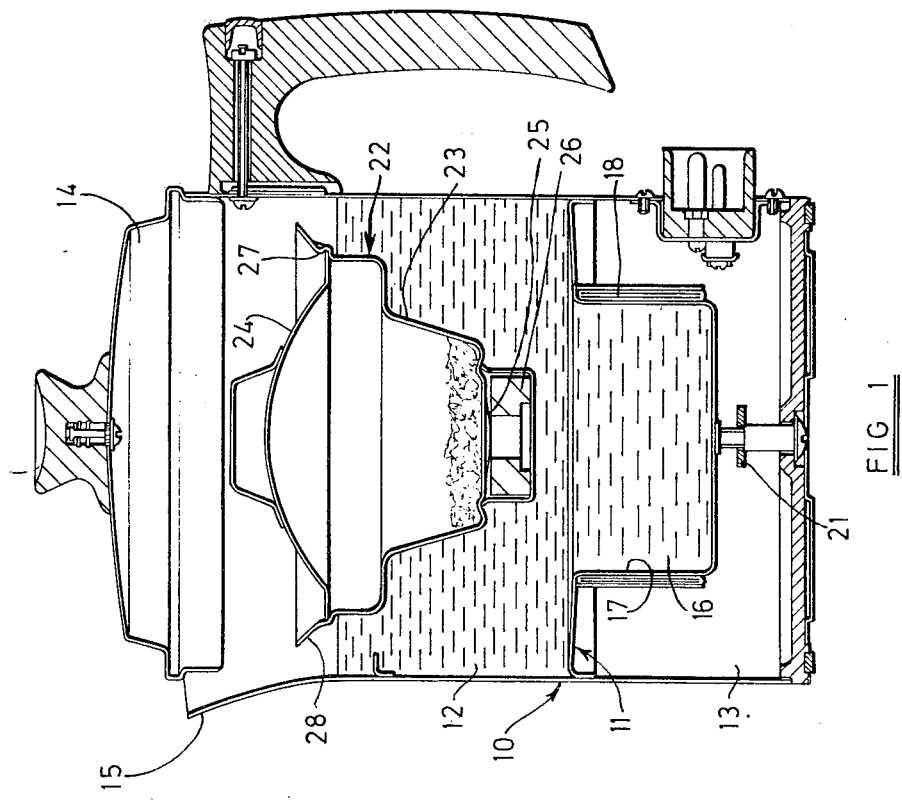
FIG. 1 shows a cross-section of a beverage maker in accordance with the invention, a receptacle of the apparatus floating on a body of primary constituent in the beverage maker.

When the receptacle 22 is in the position shown in FIG. 1, floating on the surface of the water in the upper chamber 12, the magnet 26 is so spaced from the bottom of the well 16 that it does not attract the arm 21 sufficiently to hold the latter in its upper position. The arm 21 therefore is disposed in its lower position and the switch 19 can be closed by the user. When the heating element 18 has been energised for a sufficient period the water in the upper chamber 12 commences to boil. This causes vigorous agitation of the water and splashing of some water over the rim 28 into the receptacle 22. It will be noted that the periphery of the perforate upper portion 24 lies below the upper edge of the rim 28. Accordingly, even if water which is splashed onto the upper portion 24 does not pass directly through a perforation thereof, it will be trapped on the inside of the rim 28 and will have ample opportunity to run through perforations in the upper portion 24 into the receptacle. As water is splashed into the receptacle, the latter sinks lower so that water is more easily splashed in. Eventually, the rim 28 becomes completely submerged in the water and the receptacle then sinks bodily to rest on the bottom of the well 16. This causes the switch 19 to open.

During the period when the receptacle 22 is sinking from the surface of the water in the chamber 12 to the bottom of the well 16 and immediately after this period, the water undergoes violent agitation caused by boiling. The agitation results in a vigorous flow of water into and out of the receptacle 22 through the perforations of the upper portion 24 so that when the agitation subsides the liquor formed in the receptacle by infusion of the tea leaves will have been thoroughly mixed with the body of water in the receptacle to form the brew. The tea leaves are unable to pass through the perforations of the upper portion and are retained in the receptacle.

The receptacle 22 is formed of metal and therefore sinks easily, once it becomes partly filled with water. The mass of the receptacle is very much greater than that of the dry tea leaves placed therein, so that the precise quantity of tea leaves does not significantly affect the amount of freeboard of the receptacle when floating, that is the height of the upper edge of the rim 28 above the surface of the water.

In the particular example of beverage maker shown in the accompanying drawings, the receptacle has a mass of 110 gms. The mass of water displaced by the receptacle when the upper edge of the rim 28 is level with the surface of the water is 220 gms. Accordingly, the receptacle does not sink until the sum of the mass of tea leaves and mass of water present in the receptacle is 110 gms. The upper chamber 12 is suitable for containing up to 800 mls. of water. No more than 5 gms of tea would be required to be infused in this volume of water to prepare a beverage. Normally, even in cases where the tea leaves placed in the receptacle are contained in tea bags, the combined mass of tea leaves and bags would be less than 5 gms. Prior to sinking of the receptacle, the tea leaves are heated in a very moist atmosphere, as the water in the vessel is heated. In consequence of this, the quantity of tea leaves required to infuse 800 mls. of water to produce a beverage of a given strength is less than in a case where the boiled water is mixed with dry tea leaves. It will be understood that the dimensions of the receptacle are such that it cannot contain a quantity of tea leaves whereof the mass approaches anywhere near to the additional mass required to sink the receptacle. Typically, it is not possible to place more than 10 gms. of tea leaves in the receptacle.

It will be appreciated that the receptacle 22 may be modified by the omission of the upper, perforate portion 24. This would permit the secondary constituent to escape from the receptacle into the main body of the primary constituent when the receptacle sinks. A strainer may be fitted across the pouring spout 15 to retain the secondary constituent in the chamber 12 when the beverage is poured therefrom.

The major part of the interior of the receptacle 22 may be subdivided by one or more vertical partitions into compartments for containing different secondary constituents.

It will be noted that the diameter of the receptacle 22 bears a relationship to the internal dimensions of the upper chamber 12 such that the magnet 26 is constrained to occupy a position entirely above the well 16. Accordingly, there is no risk of the sunken receptacle coming to rest with the magnet 26 situated above those parts of the partition wall 11 which are disposed laterally outwardly of the well 16.

We claim:

1. A beverage maker comprising a chamber for containing a body of water constituting a primary constituent which is to be heated and a receptacle having a space for receiving a secondary constituent which forms a beverage when infused with the heated water, the receptacle being disposed in the chamber, characterised in that the receptacle has an imperforate bottom portion to enable the receptacle to sink when a sufficient amount of the water occupies said space, the receptacle having mass means to enable the receptacle to float in the chamber on quiescent water indefinitely when containing only the secondary constituent where said imperforate bottom portion prevents the quiescent water from entering said receptacle and thereby prevents the quiescent water from sinking said receptacle, an upper portion of the receptacle defining an opening in flow communication with said space through which the water can be splashed into said space of the receptacle for mixing with the secondary constituent when the water is agitated by boiling and the receptacle being adapted to be sunk by the water which splashes in through the opening, whereby the secondary constituent within said receptacle is maintained out of contact with the water until the water boils, and where extensive contact between the water and the secondary constituent is promoted to form the beverage when said receptacle is sunk.

2. A beverage maker according to claim 1 wherein the receptacle has a rim which, when the receptacle floats on the quiescent water, extends above the surface of the quiescent water.

3. A beverage maker according to claim 2 wherein the rim extends laterally outwardly from the remainder of the receptacle.

4. A beverage maker according to claim 1 further comprising a heating element and a switch for controlling energisation of the heating element, the receptacle including a magnetic element for operating the switch to de-energise the heating element when the receptacle sinks to the bottom of the chamber and the magnetic element being situated at the bottom of the receptacle.

* * * * *